UNITED STATES PATENT OFFICE.

ARTHUR GEORGE GREEN AND ALEXANDER MEYENBERG, OF MANCHESTER, ENGLAND.

PROCESS OF MAKING BLACK SULFUR DYE.

SPECIFICATION forming part of Letters Patent No. 641,587, dated January 16, 1900.

Application filed July 21, 1899. Serial No. 724,709. (Specimens.)

*To all whom it may concern:*

Be it known that we, ARTHUR GEORGE GREEN, F. I. C., F. C. S., a subject of the Queen of Great Britain and Ireland, and ALEXANDER MEYENBERG, Ph. D., a subject of the German Emperor, both residents of Manchester, in the county of Lancaster, England, have invented a new and useful Process for Making Fast Black Dyes, (for which patents have been applied for in Great Britain, dated March 7, 1899; in Germany, dated November 27, 1898, and in France, dated April 27, 1899,) which invention is fully set forth in the following specification.

This invention refers to the production of a new black coloring-matter containing sulfur and capable of dyeing unmordanted cotton from an alkaline sulfide bath in fast black shades which withstand the action of acids, alkalies, boiling soap, light, and air to a remarkable degree. The coloring-matter is produced by conjoint oxidation of a para-amidophenol or para-diamin, such as para-phenylene diamin or paratolylene diamin, with an amin of the benzene series, such as anilin toluidin or xylidin in presence of thiosulfuric acid, under the influence of which sulfur is introduced into the new compound. The product is a black powder insoluble in water and in carbonated alkalies, but dissolving in alkaline sulfides or sulfites to a dark solution. In concentrated sulfuric acid it dissolves sparingly, forming a blue-black solution. By reducing agents, such as zinc powder and caustic soda, it is converted into a leuco compound, which on exposure to air rapidly reoxidizes.

Example: A solution of twenty-seven pounds of paraphenylene diamin in twenty-two gallons of water and three gallons of hydrochloric acid (twenty-seven per cent. HCl) is mixed with a solution of thirty-two pounds of anilin hydrochlorid in twenty gallons of water. Into this mixture one hundred and twenty-five pounds of crystallized sodium thiosulfate, (hyposulfite of soda,) $Na_2S_2O_3 + 5H_2O$, are stirred, and when dissolved there is run in a solution of one hundred pounds of sodium bichromate in fifteen gallons of water, acidified with forty-five pounds of concentrated sulfuric acid. During the reaction the temperature of the liquid is kept at from 0° to 5° centigrade by the addition of ice. After standing for some time one hundred pounds of concentrated sulfuric acid diluted with fifteen gallons of water are added, and the solution is boiled for an hour. The precipitated coloring-matter is filtered off, washed with water, and dried. The product is a black insoluble powder, which is rendered soluble by treatment with alkaline sulfides or sulfites. From a bath containing sodium sulfid it dyes cotton a deep fast black, the fastness of which is still further increased by subsequent passage through a bath containing a bichromate or a salt of copper.

The shade of the coloring-matter can be modified by varying the proportion of thiosulfate employed. By diminishing the thiosulfate the shade becomes brownish black and by increasing it becomes greenish black, the bichromate being also simultaneously varied in the same proportion.

In the foregoing process para-amido-phenol can be used as an equivalent of para-diamin exactly in the same way and in the same proportion, and therefore where in our claim we speak of "para-diamin" we wish it to be understood that we consider para-amido-phenol as its equivalent.

The products obtained by the foregoing process form the subject of separate applications filed by us on the 29th of September, 1899, Serial Nos. 732,074 and 732,075.

Having now particularly described and ascertained the nature of our said invention and in what manner the same is to be performed, we declare that what we claim is—

The new process for the production of a black sulfur containing direct cotton-dyeing coloring-matter by oxidation of a para-diamin together with a base of the benzene series in presence of thiosulfuric acid in aqueous solution under conditions substantially as described.

In testimony whereof we have signed this specification in the presence of two subscribing witnesses.

ARTHUR GEORGE GREEN.
ALEXANDER MEYENBERG.

Witnesses:
JOHN WILLIAM THOMAS,
ERNALD SIMPSON MOSELEY.